(12) United States Patent
Jin

(10) Patent No.: US 6,888,560 B2
(45) Date of Patent: May 3, 2005

(54) APPARATUS TO GENERATE A LASER BEAM DETECT SIGNAL

(75) Inventor: Bang-doo Jin, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 10/412,242

(22) Filed: Apr. 14, 2003

(65) Prior Publication Data

US 2003/0234856 A1 Dec. 25, 2003

(30) Foreign Application Priority Data

Jun. 20, 2002 (KR) ........................................ 2002-34686

(51) Int. Cl.[7] .............................................. B41J 2/435
(52) U.S. Cl. ..................................... 347/250; 347/235
(58) Field of Search ................................ 347/235, 250; 359/196, 216

(56) References Cited

U.S. PATENT DOCUMENTS

| | | | |
|---|---|---|---|
| 4,720,632 A * | 1/1988 | Kaneko | 250/235 |
| 5,365,259 A * | 11/1994 | Kanoto et al. | 347/137 |
| 5,663,558 A | 9/1997 | Sakai | |
| 5,737,007 A | 4/1998 | Kashima et al. | |
| 5,886,805 A * | 3/1999 | Park | 359/196 |
| 6,191,804 B1 * | 2/2001 | Kitagawa et al. | 347/238 |
| 2003/0025783 A1 * | 2/2003 | Mori | 347/234 |
| 2004/0109211 A1 * | 6/2004 | Kato | 359/204 |
| 2004/0109212 A1 * | 6/2004 | Shimomura | 359/205 |

OTHER PUBLICATIONS

Office Action from Chinese Patent Office dated Jul. 9, 2004.

* cited by examiner

*Primary Examiner*—Huan Tran
(74) *Attorney, Agent, or Firm*—Staas & Halsey LLP

(57) ABSTRACT

An apparatus to generate a laser beam detect signal includes a reflective mirror arranged on a part of an optical path of a laser beam which forms an electrostatic latent image on a photosensitive body, a beam detect lens to focus the laser beam reflected from the reflective mirror, and a printed circuit board having a photo diode sensor to detect the laser beam passed through the beam detect lens, generating the laser beam detect signal to synchronize a starting point of an image formation of the electrostatic latent image. The apparatus to generate a laser beam detect signal also includes a fixing part to secure the beam detect lens on the printed circuit board so that a center of an optical axis of the beam detect lens is aligned with a detection area of the photo diode sensor. Alternatively, the beam detect lens and the photo diode sensor may be integrally formed with each other. As a result, deterioration of printing quality due to errors from part allowance and an assembling process is prevented. Also, since a number of parts is reduced, the assembling process becomes simpler and fabrication costs decrease.

14 Claims, 2 Drawing Sheets

_US 6,888,560 B2_

APPARATUS TO GENERATE A LASER BEAM DETECT SIGNAL

CROSS REFERENCE TO RELATED APPLICATION

This application claims the benefit of Korean Application No. 2002-34686, filed Jun. 20, 2002, in the Korean Intellectual Property Office, the disclosure of which is incorporated herein by reference.

BACKGROUND OF THE INVENTION

1. Field of the Invention

The present invention relates to a light scanning apparatus to be used in an image forming apparatus such as a printer, a facsimile machine, a copier, etc., and more particularly, to an apparatus to detect a laser beam, and to produce a laser beam detect signal that may be used to synchronize scanning operation of the image forming apparatus, which is capable of reducing performance degradation caused by the dimension deviations and the assembly deviations introduced in the fabricating and assembling process.

2. Description of the Related Art

Generally, a light scanning apparatus of an image forming apparatus such as a printer, a facsimile machine and a copier, uses a light source that generates a beam of light such as a laser beam to form an electrostatic latent image on a photosensitive body such as a photosensitive drum or photosensitive belt.

The light scanning apparatus forms the electrostatic latent image on the photosensitive body by converting the laser beam from the light source such as a semiconductor laser into a parallel ray of light in a predetermined size through a collimator lens, deflecting a direction of the laser beam at a light deflector rotating at high speed, and emitting the laser beam along a scanning line on the photosensitive body through a scanning lens such as an f-theta lens.

In order to precisely locate the starting location where the electrostatic latent image is to be first formed on the photosensitive body (i.e., the starting location of the laser beam scanning line), an apparatus to detect the laser beam at a certain predetermined location relative to the intended starting point of the scanning line is employed. The apparatus to detect the laser beam, generates a beam detect signal, which is used by the image forming apparatus to synchronize the timing of the laser beam firing, or the like, so that the scanning is started at the intended starting point.

FIG. 1 schematically shows a conventional light scanning apparatus 10 to form an electrostatic latent image on a photosensitive body.

Referring to FIG. 1, the light scanning apparatus 10 includes a semiconductor laser 1 to emit a laser beam 14, a collimator lens 2 arranged in correspondence to the semiconductor laser 1 to form the laser beam 14 into a parallel ray of light, and a slit 3 through which the laser beam 14 passed through the collimator lens 2 is converted into a predetermined form. The light scanning apparatus 10 also includes a cylindrical lens 4 through which the laser beam 14 passed through the slit 3 is transformed into a linear light, and a light deflector 5 to deflect a direction of the laser beam. The light deflector 5 includes a rotary polygon mirror 5a supported on a motor (not shown) to be rotatably driven at a given speed.

The light scanning apparatus 10 also includes an f-theta lens 6 that compensates for error included in the laser beam 14 deflected from the rotary polygon mirror 5a, thereby emitting the laser beam 14 to a photosensitive drum 20. The light scanning apparatus 10 includes a beam detect signal generating part 30 that generates a signal used by the image forming apparatus to synchronize the image formation location of the electrostatic latent image along a laser beam scanning line 20a correctly.

The beam detect signal generating part 30 includes a reflective mirror 8 secured on a spring 7 on a portion of an optical path of the laser beam 14 that would not interfere with the scanning of the laser beam 14 along the length of the laser beam scanning line 20a. The reflective mirror 8 deflects the laser beam 14 in the direction of a beam detect lens 9. The beam detect lens 9 is secured on a frame 13 to focus the laser beam 14 from the reflective mirror 8 onto a photo diode sensor 11. The photo diode sensor 11 upon detection of the laser beam 14 generates a beam detect signal. The photo diode sensor 11 may be assembled either in a printed circuit board 12 (PCB), which also supports the semiconductor laser 1 which is secured on the frame 13, or in a separate printed circuit board (not shown).

An operation of the conventional light scanning apparatus 10 will be described below. In accordance with input image signals, the laser beam 14 is emitted from the semiconductor laser 1, and converted into the parallel ray of light by the collimator lens 2. Then, after passing through the slit 3 that shapes the laser beam 14 in a predetermined form, the laser beam 14 is passed through the cylindrical lens 4, and then deflected by deflecting faces of the polygon mirror 5a which is rotated at relatively high speed by the motor (not shown).

Next, the laser beam 14 is made to selectively pass through the f-theta lens 6 to be converged on the photosensitive drum 20 in a form of a light spot, thereby scanning the scanning line 20a of a predetermined effective scanning width along the main scanning direction as shown in FIG. 1. At this time, the photosensitive drum 20 is driven to rotate in the sub-scanning direction by a driving motor (not shown). Accordingly, as a result of scanning movements of light spots in the main scanning direction and the rotation of the photosensitive drum 20 in the sub-scanning direction, a predetermined electrostatic latent image is formed on the photosensitive drum 20.

In order to start each of the scanning lines 20a at the correct starting point, the laser beams 14 deflected from the rotary polygon mirror 5a is detected at a predetermined location either prior to the start of or past the end of the effective scanning width of the laser beam scanning line 20a. The laser beam 14, which have passed through f-theta lens 6 is deflected by the reflective mirror 8 placed at the predetermined location in the main scanning direction toward the beam detect lens 9. When the laser beam 14 deflected by the reflective mirror 14 is received by the photo diode sensor 11, the photo diode sensor 11 in response thereto produces a beam sensed signal. The beam sensed signal itself may be taken as the beam detect signal, or, in the alternative, is converted into suitable voltage and/or current, by a beam detect signal generation circuit (not shown), which may be disposed on the same PCB 12, to generate the beam detect signal.

The beam detect signal so generated is input to a controller (not shown), which controls timings of both a scanning start and the image formation of the light spots on the photosensitive drum 20. The controller uses the beam detect signal in order to determine the proper location for the scanning start.

However, the conventional light scanning apparatus 10 operated as above has a rather complex structure in which the photo diode sensor 11 of the beam detect signal generating part 30 is secured on the frame 13 through the PCB 12 or on another PCB separately prepared for the photo diode sensor 11, while the beam detect lens 9 is directly secured on the frame 13. Accordingly, dimension and assemblage deviations or errors are frequently generated during a process of fabricating and assembling parts such as the beam detect lens 9, the frame 13, the photo diode sensor 11.

When the errors occur during the fabrication and assembling, a center of an optical axis of the beam detect lens 9 is hardly aligned with a detecting area of the photo diode sensor 11. Accordingly, as the laser beams 14 are irregularly incident on the photo diode sensor 11, a detection location of the laser beam varies, and as a result, a constant printing quality is not guaranteed.

SUMMARY OF THE INVENTION

Accordingly, it is an aspect of the present invention to provide a beam detect signal generating apparatus to minimize dimension deviations and assembly deviations of components in the fabricating and assembling process, thus guaranteeing regular printing quality.

It is another aspect of the present invention to provide a beam detect signal generating apparatus having a beam detect lens integrally formed on a printed circuit board where a photo diode sensor is disposed, thereby guaranteeing a regular printing quality, and also a reduction in the number of parts and fabrication costs.

It is yet another aspect of the present invention to provide a beam detect signal generating apparatus having a beam detect lens and a photo diode sensor integrally formed with each other, thereby guaranteeing a regular printing quality, and also a reduction in number of parts and fabrication costs.

Additional aspects and advantages of the invention will be set forth in part in the description which follows and, in part, will be obvious from the description, or may be learned by practice of the invention.

The foregoing and/or other aspects of the present invention are achieved by providing an apparatus to generate a laser beam detect signal including a reflective mirror arranged on a part of an optical path of a laser beam which forms an electrostatic latent image on a photosensitive body, a beam detect lens to focus the laser beam reflected from the reflective mirror, and a printed circuit board having a photo diode sensor to detect the laser beam passed through the beam detect lens, and to generate the laser beam detect signal to synchronize a starting point of an image formation of the electrostatic latent image. The apparatus also includes a fixing unit to secure the beam detect lens on the printed circuit board so that a center of an optical axis of the beam detect lens is aligned with a detection area of the photo diode sensor.

According to an aspect of the invention, the fixing unit includes a body integrally formed on the beam detect lens, and a thermal fusion part to unite the body onto the printed circuit board by a thermal fusion.

According to an aspect of the invention, the thermal fusion part includes at least one thermal fusion leg formed on the body, and at least one opening formed in the printed circuit board to receive the thermal fusion leg.

According to an aspect of the invention, the fixing unit includes a body integrally formed on the beam detect lens, and a fastening part to fasten the body onto the printed circuit board.

According to an aspect of the invention, the fastening part includes at least one bolt formed on the body, at least one opening formed in the printed circuit board to receive an end of the bolt, and a screw part to secure the end of the bolt in the opening.

According to another aspect of the invention, the printed circuit board includes a light source to generate the laser beam.

According to an aspect of the invention, the printed circuit board includes a separate printed circuit board to secure the photo diode sensor thereon.

The foregoing and/or other aspects of the present invention are achieved by providing an apparatus to generate a laser beam detect signal includes a reflective mirror arranged on a part of an optical path of a laser beam which forms an electrostatic latent image on a photosensitive body, a beam detect lens to focus the laser beam reflected from the reflective mirror, and a printed circuit board having a photo diode sensor to detect the laser beam passed through the beam detect lens, and to generate the laser beam detect signal to synchronize a starting point of an image formation of the electrostatic latent image.

According to an aspect of the invention, the beam detect lens and the photo diode sensor are integrally formed with each other so that a center of an optical axis of the beam detect lens is aligned with a detection area of the photo diode sensor.

BRIEF DESCRIPTION OF THE DRAWINGS

The above and/or other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
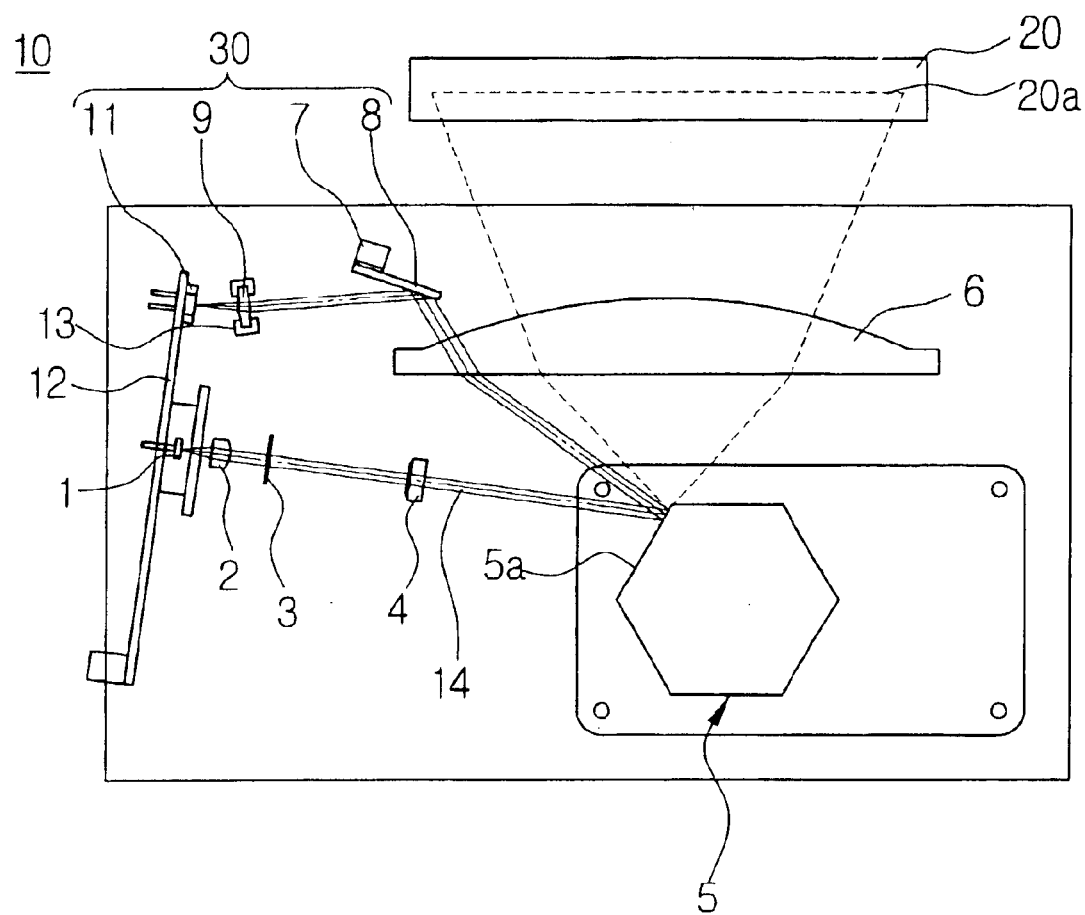
FIG. 1 is a schematic view of a conventional light scanning apparatus.

Reference will now be made in detail to the present preferred embodiments of the present invention, examples of which are illustrated in the accompanying drawings, wherein like reference numerals refer to like elements throughout.

Figure 2:
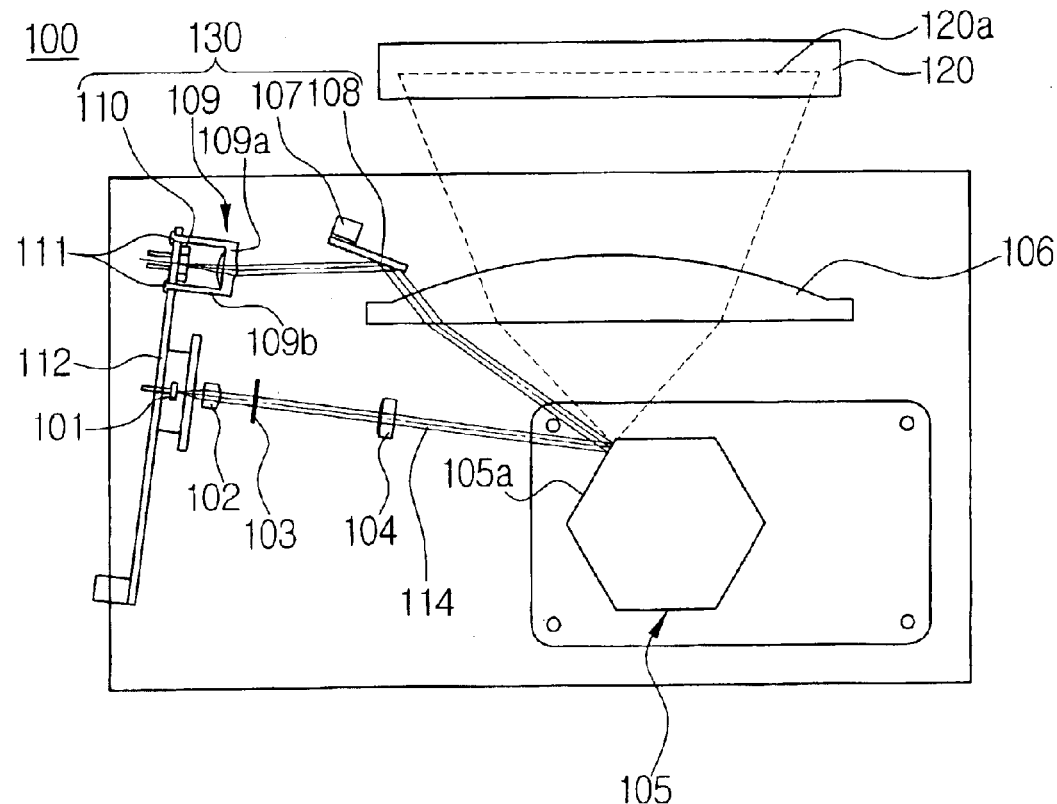
FIG. 2 is a schematic view of a light scanning apparatus having a beam detect signal generating apparatus, according to an embodiment of the present invention.

FIG. 2 shows a light scanning apparatus 100 having a beam detect signal generating apparatus, according to an embodiment of the present invention.

The light scanning apparatus 100 having the beam detect signal generating apparatus includes a semiconductor laser 101, a collimator lens 102, a slit 103, a cylindrical lens 104, a light deflector 105 and an f-theta lens 106.

A description of the construction of the above-described elements will be omitted hereinafter, as they are identical to that of the conventional light scanning apparatus as described above.

The beam detect signal generating apparatus 130 includes a reflective mirror 108 arranged on a part of an optical path of a laser beam 114 that defines a laser beam scanning line 120a to form an electrostatic latent image on a photosensitive drum 120 through the f-theta lens 106. The beam detect signal generating apparatus includes a beam detect lens 109a to focus the laser beam 14 reflected from the reflective mirror 108, a photo diode sensor 110 to detect the laser beam 114 passed through the beam detect lens 109a to correctly synchronize a starting point of the laser beam scanning line 120a, and a printed circuit board (PCB) 112 to fix the photo diode sensor 110 and the semiconductor laser 101 in position.

The reflective mirror 108 is secured on a frame (not shown) of the light scanning apparatus by a spring 107. The beam detect lens 109a is secured on the PCB 112 through a fixing part 109 that is integrally formed with the beam detect lens 109a so that a center of an optical axis thereof is aligned with a detection area of the photo diode sensor 110.

The fixing part 109 includes a body 109b integrally formed with the beam detect lens 109a, and a thermal fusion part 111 to unite the body 109b with the PCB 112 by thermal fusion.

Figure 3:
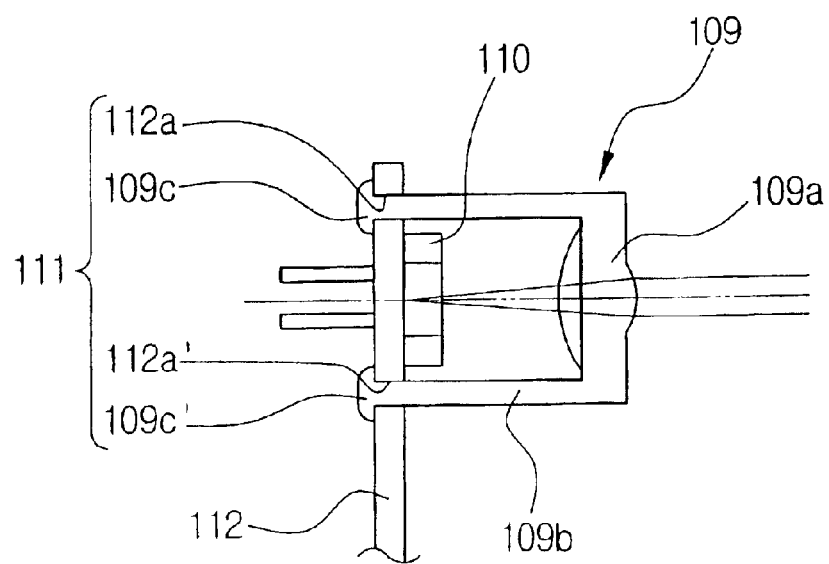
FIG. 3 is a detailed view of a securing part of the beam detect signal generating apparatus of FIG. 2.

As shown in FIG. 3, the thermal fusion part 111 includes a plurality of thermal fusion legs 109c, 109c' formed on the body 109b, and a plurality of holes or openings 112a, 112a' to receive the thermal fusion legs 109c, 109c'.

Alternatively, the fixing part 109 may include a body (not shown) integrally formed with the beam detect lens 109a, and a fastening part (not shown) to fasten the body on the PCB 112. The fastening part includes a plurality of bolts (not shown) formed on the body, a plurality of holes or openings (not shown) formed in the PCB 112 to receive ends of the bolts, and screws to secure the ends of the bolts in the openings.

As shown in FIG. 2, the photo diode sensor 110 and the fixing part 109 are depicted as being secured on the PCB 112 where the light source such as the semiconductor laser 101 to generate the laser beam 110 is formed. Alternatively, the photo diode sensor 110 may be secured on a separate PCB or a holder (not shown) which is provided to fix the photo diode sensor 110.

Further, the photo diode sensor 110 is formed on the PCB 112 separately from the beam detect lens 109a. Alternatively, errors in a fabricating and assembling process may be reduced by forming the beam detect lens 109a and the photo diode sensor 110 integrally on a common body, with a part of the common body or the photo diode sensor 109a being secured on the PCB 112.

As described above, unlike the conventional light scanning apparatus 10 in which the photo diode sensor 11 and the beam detect lens 9 are separately secured on the PCB 12 or the holder, and the frame 13, the photo diode sensor 110 and the beam detect lens 109a of the light scanning apparatus 100 of the present invention are simultaneously secured on the PCB 112. Accordingly, printing quality deterioration due to errors from part allowance of the frame and the PCB, and errors from an assembling process may be prevented. Further, as a number of parts is reduced, the assembling process is simplified and fabrication cost decreases.

The operation of the beam detect signal generating apparatus 130 and the light scanning apparatus 100 are similar to that of the beam detect signal generating part 30 and the light scanning apparatus 10 described above with reference to FIG. 1. Accordingly, the description thereof will be omitted here.

As described, the photo diode sensor and the beam detect lens are simultaneously secured on the printed circuit board in the synchronizing signal detecting apparatus according to the present invention. As a result, deterioration of printing quality due to the errors from the part allowance and assembling process is prevented. Also, since the number of parts is reduced, the assembling process becomes simpler and the fabrication costs decreases.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to generate a laser beam detect signal, comprising:

a reflective mirror arranged on a part of an optical path of a laser beam which forms an electrostatic latent image on a photosensitive body;

a beam detect lens to focus the laser beam reflected from the reflective mirror;

a printed circuit board having a photo diode sensor to detect the laser beam passed through the beam detect lens, and to generate the laser beam detect signal to synchronize a starting point of an image formation of the electrostatic latent image; and a fixing unit integrally formed with the beam detect lens, to secure the beam detect lens on the printed circuit board so that a center of an optical axis of the beam detect lens is aligned with a detection area of the photo diode sensor.

2. The apparatus of claim 1, wherein the fixing unit comprises:

a body integrally formed on the beam detect lens; and a thermal fusion part to unite the body onto the printed circuit board by a thermal fusion.

3. The apparatus of claim 2, wherein the thermal fusion part comprises:

at least one thermal fusion leg formed on the body; and at least one opening formed in the printed circuit board to receive the thermal fusion leg.

4. The apparatus of claim 1, wherein the fixing unit comprises:

a body integrally formed on the beam detect lens; and a fastening part to fasten the body onto the printed circuit board.

5. The apparatus of claim 4, wherein the fastening part comprises:

at least one bolt formed on the body;

at least one opening formed in the printed circuit board to receive an end of the bolt; and a screw part to secure the end of the bolt in the opening.

6. The apparatus of claim 1, wherein the printed circuit board includes a light source to generate the laser beam.

7. The apparatus of claim 1, wherein the printed circuit board is a separate printed circuit board to secure the photo diode sensor thereon.

8. The apparatus of claim 1, further comprising:

a spring; and a frame to secure the reflective mirror of the apparatus with the spring.

9. The apparatus of claim 1, wherein the photo diode sensor and the fixing part are secured on the printed circuit board.

10. An apparatus to generate a laser beam detect signal, comprising:

a reflective mirror arranged on a part of an optical path of a laser beam which forms an electrostatic latent image on a photosensitive body;

a beam detect lens to focus the laser beam reflected from the reflective mirror; and a printed circuit board having a photo diode sensor to detect the laser beam passed through the beam detect lens, and to generate the laser beam detect signal to synchronize a starting point of an image formation of the electrostatic latent image;

wherein the beam detect lens and the photo diode sensor are integrally formed with each other so that a center of an optical axis of the beam detect lens is aligned with a detection area of the photo diode sensor.

11. The apparatus according to claim 10, further comprising:

a common body to integrally form the beam detect lens and the photo diode sensor.

12. The apparatus according to claim 11, wherein a part of the common body or the photo diode sensor is secured to the printed circuit board.

13. An apparatus to generate a laser beam detect signal, comprising:

a reflective mirror arranged on a part of an optical path of a laser beam which forms an electrostatic latent image on a photosensitive body;

a beam detect lens to focus the laser beam reflected from the reflective mirror;

a photo diode sensor to detect the laser beam passed through the beam detect lens, and to generate the laser beam detect signal to synchronize a starting point of an image formation of the electrostatic latent image; and a printed circuit board to fix the photo diode sensor to the printed circuit board;

wherein the beam detect lens and the photo diode sensor are integrally formed with each other and simultaneously secured on the printed circuit board so that a center of an optical axis of the beam detect lens is aligned with a detection area of the photo diode sensor.

14. An apparatus to generate a laser beam signal, comprising:

a semiconductor laser to generate a laser beam which forms an electrostatic latent image on a photosensitive body;

a reflective mirror arranged on a part of an optical path of the laser beam;

a beam detect lens to focus the laser beam reflected from the reflective mirror;

a photo diode sensor to detect the laser beam passed through the beam detect lens, and to generate the laser beam detect signal to synchronize a starting point of an image formation of the electrostatic latent image;

a first printed circuit board to fix the semiconductor laser to the first printed circuit board;

a second printed circuit board to fix the photo diode sensor to the second printed circuit board; and a fixing unit integrally formed with the beam detect lens, to secure the beam detect lens on the second printed circuit board so that a center of an optical axis of the beam detect lens is aligned with a detection area of the photo diode sensor.

* * * * *

UNITED STATES PATENT AND TRADEMARK OFFICE
CERTIFICATE OF CORRECTION

PATENT NO. : 6,888,560 B1
DATED : May 3, 2005
INVENTOR(S) : Bang-doo Jin

It is certified that error appears in the above-identified patent and that said Letters Patent is hereby corrected as shown below:

Column 7,
Line 7, change ";" to -- ; --.
Line 31, change ";" to -- , --.

Signed and Sealed this

Tenth Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,888,560 B2
DATED : May 3, 2005
INVENTOR(S) : Bang-doo Jin

It is certified that error appears in the above-identified patent and that said Letters Patent is hereby corrected as shown below:

Column 7,
Line 7, change ";" to -- , --.

Signed and Sealed this

Twenty-eighth Day of March, 2006

JON W. DUDAS
*Director of the United States Patent and Trademark Office*